Nov. 29, 1927.
C. J. TRAVERS
1,650,668
TRACTOR
Filed Oct. 3, 1923
3 Sheets-Sheet 1
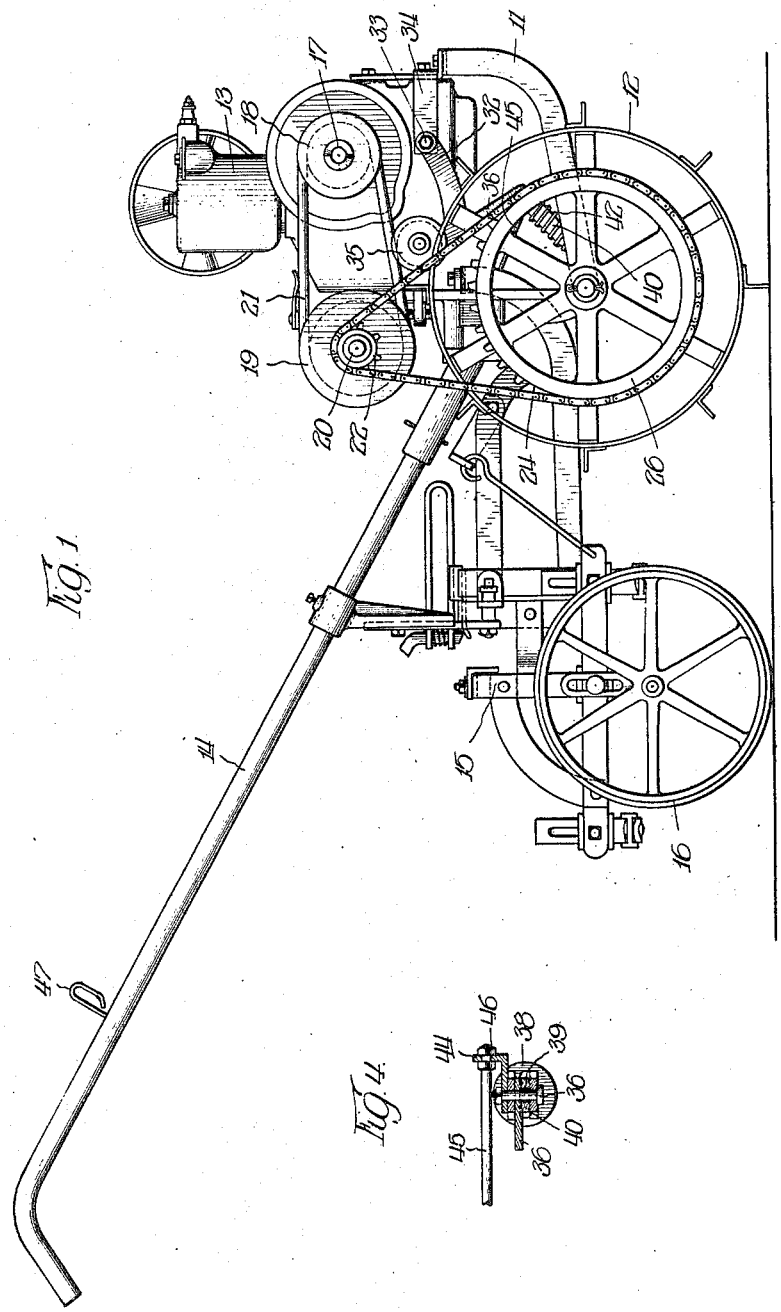

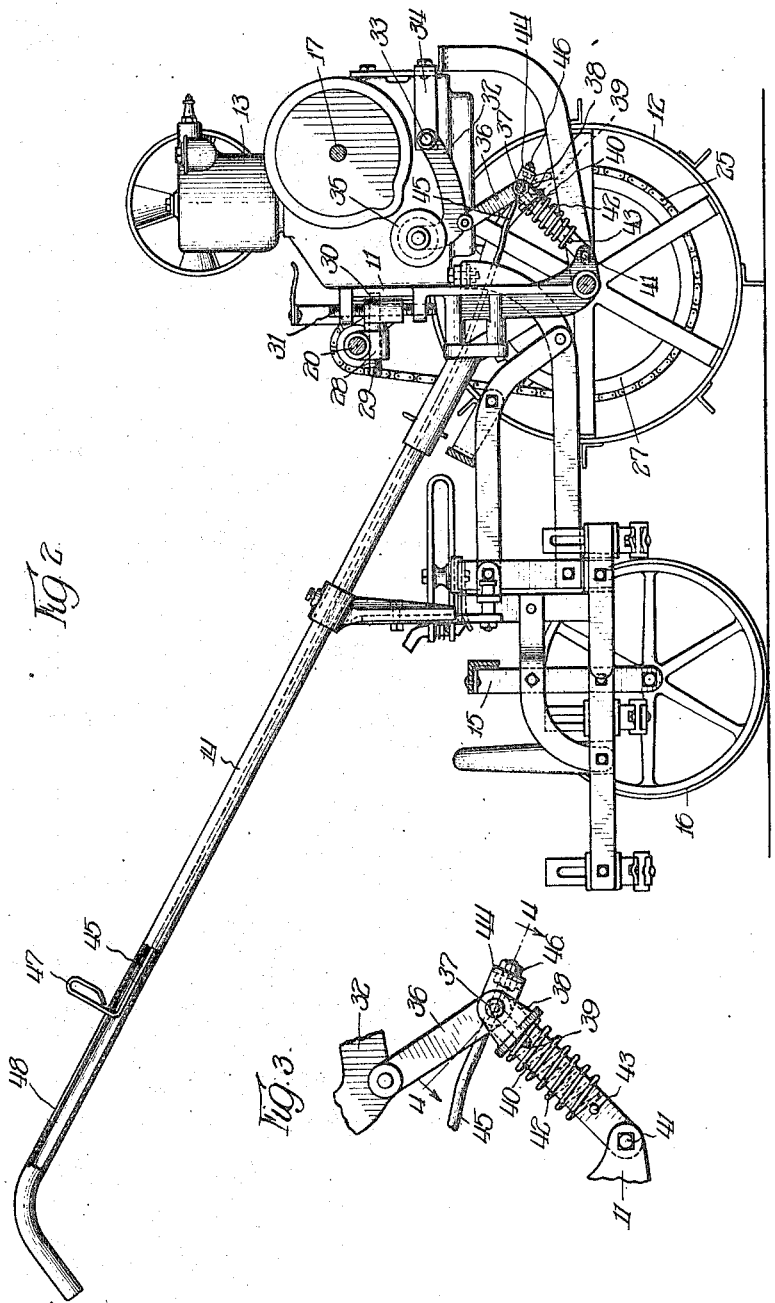

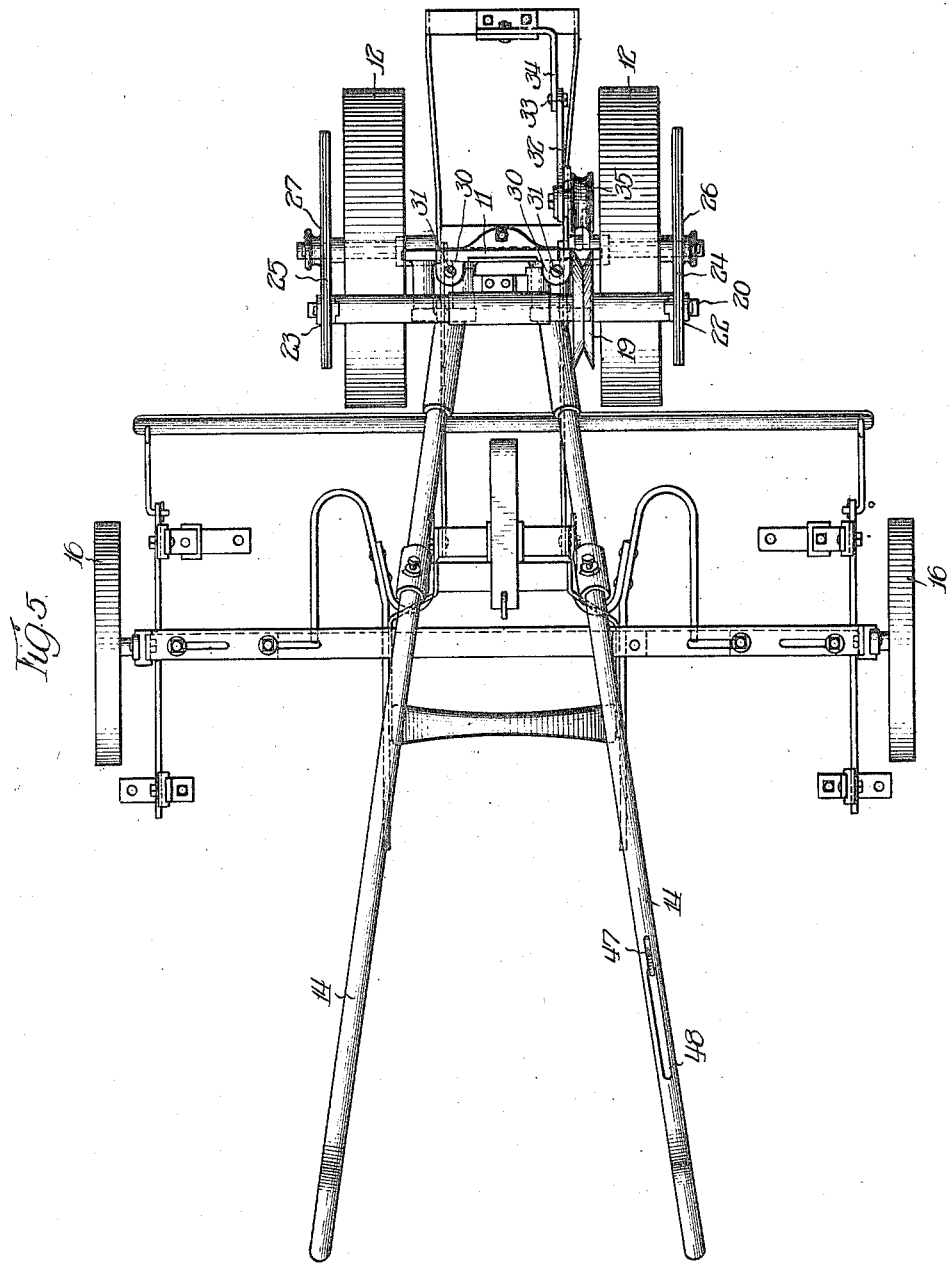

Patented Nov. 29, 1927.

1,650,668

UNITED STATES PATENT OFFICE.

CHARLES J. TRAVERS, OF PORT WASHINGTON, WISCONSIN, ASSIGNOR TO GILSON MANUFACTURING COMPANY, OF PORT WASHINGTON, WISCONSIN, A CORPORATION OF WISCONSIN.

TRACTOR.

Application filed October 3, 1923. Serial No. 666,243.

This invention relates to a new and improved tractor and more particularly to a tractor drive and drive control mechanism.

With small tractors of the type used for cultivators and similar machines, it is highly desirable that the drive be as simple and inexpensive in construction as possible and also that it be substantially fire-proof. The control of the drive should be capable of rapid application and rapid disengagement in order that the movement of the tractor may be readily controlled. Drives of the types utilizing belts or chains are simple and inexpensive in construction and easy of operation but it is necessary that means be provided for varying the relative position of the parts in order to take up stretch or wear in the belts and maintain an efficient drive.

It is an object of the present invention to provide a tractor drive which permits the ready adjustment of the driving parts in order to maintain the proper tension upon the driving elements.

It is also an object to provide a construction of this character in which the drive may be readily rendered operative or inoperative by a single movement and in which the connection will be effective regardless of the relative adjustment of the parts.

It is also an object to provide a construction of this character which is simple in design and composed of but few parts and adapted for ready commercial production.

Other and further objects will appear as the description proceeds.

I have illustrated a preferred embodiment of my invention in the accompanying drawings, in which—

Figure 1 is a side elevation of a tractor equipped with my improved drive and drive control;

Figure 2 is a view similar to Figure 1 with the parts removed and broken away in order to show the drive control mechanism;

Figure 3 is a view on an enlarged scale showing the toggle construction;

Figure 4 is a section taken on line 4—4 of Figure 3; and

Figure 5 is a plan view of the tractor, the engine being removed in order to show the drive parts.

The tractor comprises the main frame 11 supported upon the drive wheels 12. To this frame is secured the engine 13. The main frame is guided by the pair of handle bars 14. The implement carrying frame 15 provided with wheels 16 is connected to the rear of the main frame. The engine 13 drives the shaft 17 carrying the pulley 18. The driven pulley 19 is carried upon the intermediate shaft 20 and the belt 21 connects pulleys 18 and 19. The shaft 20 also carries the sprockets 22 and 23 which are connected by chains 24 and 25 with the driven sprockets 26 and 27 which latter are positively secured to the wheels 12.

As best shown in Figure 2, the shaft 20 is carried in the bearing members 28 which are fitted upon the adjusting screw 29. This adjusting screw 29 fits into the adjustable member 30 which is adjustably supported by screws 31 from the main frame 11. It will be noted that the screws 29 and 31 are at right angles to each other so that the position of the shaft 20 may be adjusted both laterally and vertically.

The swinging arm 32 is pivoted at 33 to the frame member 34. This arm 32 carries the idler pulley 35 adapted to engage the belt 21. The lower side of the arm 32 is pivotally connected to the link 36, the lower end of this link carrying the pin 37 fitting in the slide member 38.

As best shown in Figure 3, the pin 37 also extends through the slot 39 formed in link 40, the lower end of which is pivotally connected at 41 to the main frame. The spring 42 is fitted upon link 40, its upper end engaging the slide 38 and its lower end engaging the pin 43. Also pivoted upon pin 37 is the angle member 44 to which the control rod 45 is secured by means of nuts 46. This control rod 45 extends upwardly through one of the hollow handle bars 14 and is provided with the handle portion 47 which extends upwardly through the slot 48 formed in the handle bar.

In the operation of the tractor, power is supplied by the engine to pulley 18 and if the belt 21 is properly tightened, it is transmitted from pulley 18 to pulley 19 and thus to shaft 20 and sprockets 22 and 23. The sprockets 22 and 23 drive the larger sprockets 26 and 27 by means of sprocket chains 24 and 25 and consequently drive wheels 12 and cause the motion of the tractor.

In order to maintain the sprocket chains 24 and 25 at a tension adapted to drive without binding and also without danger of slipping from the sprockets, it is desirable to be able to vary or adjust the distance between the sprockets. This permits a finer adjustment than one made by removing or adding a link to the chain. This adjustment may be made by raising or lowering the shaft 20 by means of the adjusting screws 31.

It is likewise desirable to maintain a distance between shafts 17 and 20 such that the belt when not tightened by the idler pulley will slip and transmit no power. The distance should be also such that the pulley when moved inwardly will tighten the belt to cause transmission of the full power. This adjustment is accomplished by moving the shaft 20 laterally in either direction by means of the adjusting screw 29.

In the position shown in Figure 2, the toggle construction is thrown to the right and the idler pulley is in its outer position. In this position the belt 21 is loose and transmits no power. It will be noted that in this position of the toggle construction the control handle 47 bears against the lower end of the slot 48 in which it operates. Also the spring 42 is extended and forces the slide 38 upwardly until the pin 37 is at the upper end of the slot 39.

When it is desired to apply power, the handle 47 is drawn upwardly. This moves the center pivot of the toggle to the left during which movement the pin 37 is thrust downwardly of the slot 39 and the spring 42 is compressed. As the links 36 and 40 pass beyond the straight line position the spring 42 carries the slide 38 and pin 37 upwardly and the force of the spring thrusts the handle 47 to the upper end of the slot 48. The position of this upper end of the slot is so calculated that the links 40 and 36 are but slightly beyond a straight-line position and the idler pulley 35 is consequently lifted above the position in which it is shown in Figure 2. This raised position is such as to cause it to engage and properly tighten the drive belt 21. It will be noted, however, that the thrust upon the belt is that caused by the compression of the spring 42 and the belt is thus yieldingly pressed and urged into driving engagement.

To throw off the power, it is merely necessary to push the handle 37 downwardly sufficiently to carry the links 40 and 36 beyond the straight-line position when the spring 42 will carry them to the position shown in Figure 2.

I have shown one preferred form of my invention by way of example but I contemplate such changes and modifications as come within the spirit and scope of the appended claims.

I claim:

1. In a power cultivator, a driving pulley, a driven pulley, a belt connecting the two pulleys, an idler pulley, a pivoted arm carrying said idler pulley, a toggle construction connecting the pivoted arm and a fixed portion of the cultivator, a toggle control lever, means associated with the toggle lever adapted to limit its movement, and a spring associated with the toggle construction adapted normally to maintain the toggle control lever at a limit of movement, and to allow yielding movement of the toggle belt tightener when overthrown, the idler pulley at one limit of movement engaging and tightening the belt and at the other limit of movement being disengaged from the belt.

2. In a power cultivator, a driving pulley, a driven pulley, a belt connecting said pulleys, an intermediate shaft carrying said driven pulley, positive drive means connecting the intermediate shaft and the cultivator wheels, means supporting the intermediate shaft whereby the shaft may be adjusted to vary distance between the driving and driven pulleys, and spring pressed toggle means adapted selectively to cause the idler pulley to engage the belt throughout the adjustment range of the intermediate shaft, or to remain clear of said belt and to allow yielding movement of the toggle belt tightener when overthrown.

Signed at Port Washington, Wisconsin, this 24th day of September, 1923.

CHARLES J. TRAVERS.